Patented Oct. 27, 1925.

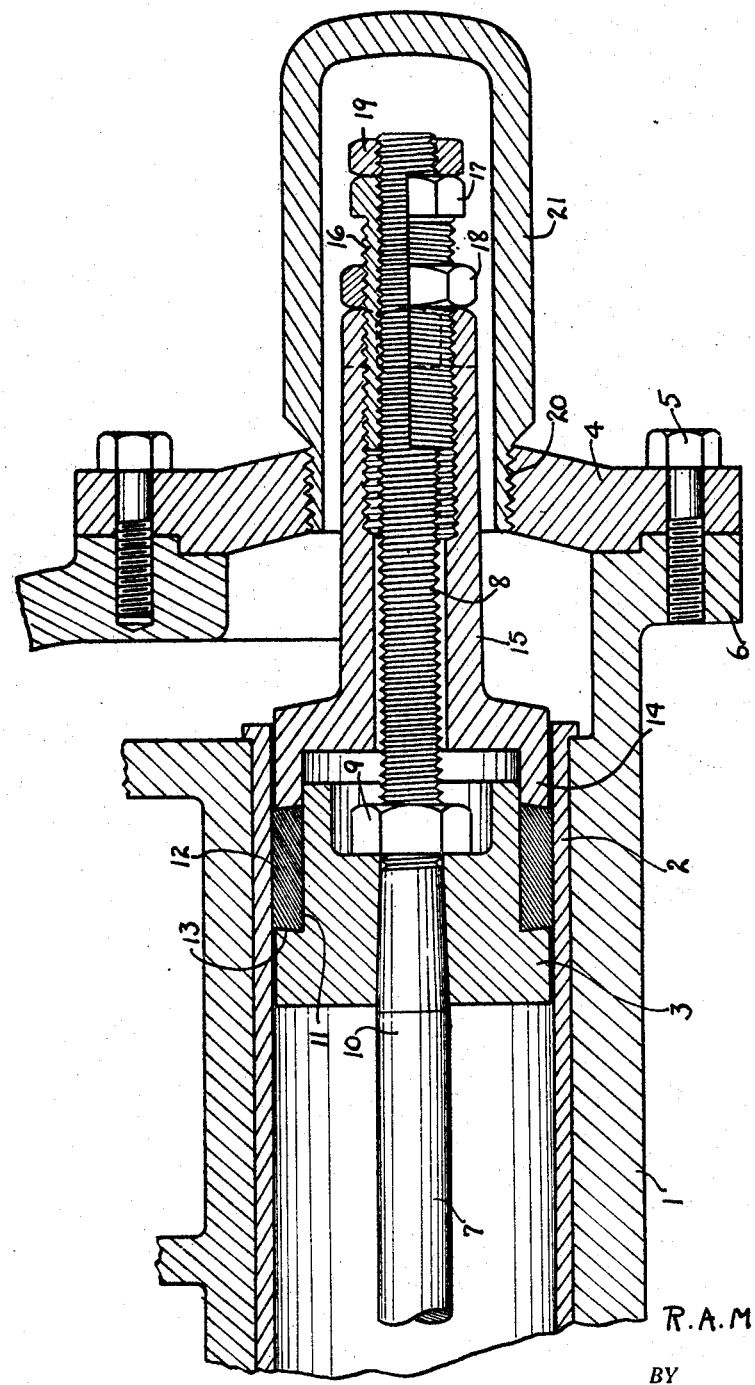

1,558,749

UNITED STATES PATENT OFFICE.

ROBERT A. MUELLER, OF HOUSTON, TEXAS.

ADJUSTABLE PUMP PISTON.

Application filed April 20, 1925. Serial No. 24,638.

*To all whom it may concern:*

Be it known that I, ROBERT A. MUELLER, a citizen of the United States, residing at Houston, Harris County, Texas, have invented a certain new and useful Improvement in Adjustable Pump Pistons, of which the following is a specification.

My invention relates to pump pistons and more particularly to pump pistons used on horizontal pumps of the double action type, such as are employed in pumping the flushing fluid in well drilling operations.

It is an object of the invention to provide a pump piston and the cylinder in which it works, so constructed as to allow the packing to be expanded when necessary without removing the piston from the cylinder. It is also desired that the packing be expanded without rotating or mutilating the packing ring. It is a further object to compress the packing longitudinally and expand the same outwardly with a minimum amount of adjustment of the expanding mechanism.

Referring to the drawing, there is shown a central, vertical section through one end of a pump cylinder, with a piston therein showing my invention employed thereon. The pump housing is shown only fragmentarily. There is a cylinder 1, having a lining 2 therein in which the piston 3 is adapted to work. The end of the cylinder housing 1 is extended beyond the cylinder and has a cylinder head 4 secured thereon by means of the cap screws 5 extending through the margin of the cylinder head and the flange 6 of the cylinder housing.

The piston 3 is a solid block, cylindrical in general outline, with a central opening therethrough to receive the piston rod 7. The forward end of the rod is extended some distance beyond the head of the piston and is threaded at 8 to accommodate the packing-expanding device which will be described. The outer end of the piston is recessed to receive a nut 9 by which it is clamped upon the tapered portion 10 of the piston rod.

The forward end of the piston is reduced in diameter to provide a seat 11 for the packing ring 12 of rubber or other flexible material or composition. Said packing ring may be slightly wider at its inner side than on its outer side to fit beneath a slightly under-cut shoulder 13 upon the piston head.

The follower plate 14 at the forward end of the piston is formed as a cap fitting over the reduced end of the piston. It has a forwardly-extending sleeve 15 thereon which is spaced slightly from the piston rod on its inner surface. It is threaded internally on the forward end to receive an elongated tubular nut 16, threaded on its inner side to screw upon the piston rod 8, and threaded exteriorly in the opposite direction to screw within the sleeve 15. The piston rod is threaded with a righthand or clockwise thread, and the outer surface of the nut has a lefthand or counter-clockwise thread. The forward end of the nut 16 has a polygonal head 17 thereon to enable it to be operated through a wrench in the usual manner. I also provide a lock-nut 18 on the nut 16 and a locknut 19 upon the piston rod.

To enable the operator to obtain easy access to the adjusting mechanism the cylinder head 4 has a central opening therein threaded at 20 and an elongated cap or bull plug 21 is screwed therein. Said bull plug thus serves as a housing for the end of the piston rod and the adjusting mechanism; but may be easily removed when it is desirable to adjust the pressure on the packing ring 12.

The operation of the device becomes necessary when the packing becomes worn so that there is no longer a close fit with the cylinder. The bull plug 21 is then unscrewed and a wrench employed to loosen the lock nuts 18 and 19 after which the nut 17 is rotated in a righthand direction. It is thus moved inwardly along the threaded portion 8 of the piston rod. It also acts to screw the sleeve 15 forwardly on the nut 16. This is accomplished because of the lefthand threaded engagement between the tubular nut 16 and said sleeve. In this manner the follower plate 14 is not rotated, but is moved toward the piston with a double thrust due to the action of the nut 16. If at any time the follower plate tends to rotate when the nut 16 is rotated, a pipe tongs may be employed to hold it from rotation while the nut 16 is being screwed up.

The advantages of this construction lie in the ease and dispatch with which the packing may be expanded, and also in the fact that the follower plate is not rotated but is simply moved strongly against the packing ring to expand it by only a short turn of the nut 16. When tightened again, the lock nuts may be employed to retain the parts in adjusted position, until further adjustment may become necessary.

Having thus described my invention, what I claim as new and desire to protect by Letters Patent is:

1. In a pump, a cylinder, a cylinder head detachably mounted thereon, a piston rod, a piston on said rod in said cylinder, a seat on said piston, a packing ring in said seat, a follower plate on one end of said piston bearing slidably against said ring, a sleeve on said plate adapted to extend through an opening in said cylinder head, and a nut on said piston rod having a threaded engagement with said rod and said sleeve, and adapted to be rotated to slide said plate against said packing ring without rotating said plate.

2. In a pump, a cylinder, a piston therein, a piston rod having its forward end extending beyond the said piston and threaded, a packing ring on said piston, a follower plate on the forward end of said piston bearing against said packing ring, a forward sleeve on said plate spaced outside said piston rod extension, and a nut having threaded engagement with said rod on its inner surface, and also with said sleeve on its outer surface, but in an opposite direction, whereby the rotation of said nut will force said sleeve and plate toward said piston with a double thrust in the manner described.

3. In a pump, a cylinder, a piston therein, a piston rod extending through said piston for some distance and threaded, a nut thereon clamping said piston immovably on said rod, a packing ring on said piston, a follower plate bearing against said ring, a sleeve on said plate surrounding said piston rod extension, and an elongated nut on said rod having threaded engagement with said rod and sleeve, but in opposite directions, whereby the rotation of said elongated nut will force said sleeve and plate slidably along said rod.

4. In a pump, a cylinder, a piston therein, a piston rod passing through said piston and having a forward threaded extension thereon, means to clamp said piston firmly on said rod, a packing ring on said piston, a follower plate, and an elongated nut on said piston rod extension having threaded engagement with both the piston rod and follower plate, said engagement being operable in opposite directions, whereby said nut may force said plate nonrotatably along said rod with a double thrust.

5. In a pump, a cylinder, a piston therein, a piston rod passing through said piston and having a forward threaded extension thereon, means to clamp said piston firmly on said rod, a packing ring on said piston, a follower plate, and an elongated nut on said piston rod extension having threaded engagement with both the piston rod and follower plate, said engagement being operable in opposite directions, whereby said nut may force said plate nonrotatably along said rod with a double thrust, and removable means to house said piston rod extension and said nut.

6. In a pump, a cylinder, a piston therein, a piston rod passing through said piston and having a forward threaded extension thereon, means to secure said piston rigidly on said rod, a flexible packing ring on said piston, a follower plate having a sleeve thereon outside said rod, and means on said piston rod extension, having threaded engagement with said sleeve and said rod, to move said sleeve and follower plate nonrotatably on said rod against said packing ring.

7. In a pump piston, a piston head, a piston rod having a forward threaded extension projecting beyond said piston head, a packing ring of flexible material on said piston, a follower plate on the forward end of said piston engaging said ring, a tubular extension on said plate, a nut having a right hand threaded engagement with said rod and a lefthand threaded engagement with said tubular extension, and a removable housing for said piston rod extension.

8. In a pump piston, a head, a packing ring of flexible material thereon, a piston rod projecting through said head and having a forward extension thereon, means to secure said piston on said rod, a follower plate bearing against said packing ring, and means on the forward end of said rod to hold said plate normally against movement in either direction and adapted to force it nonrotatably against said ring when desired.

In testimony whereof I hereunto affix my signature this 6th day of April, A. D. 1925.

ROBERT A. MUELLER.